US006574312B2

(12) United States Patent
Salmans et al.

(10) Patent No.: US 6,574,312 B2
(45) Date of Patent: Jun. 3, 2003

(54) ELECTRONIC PATCH PANEL APPARATUS AND METHOD OF USE

(76) Inventors: Louis J. Salmans, 19003 Meta Rd., Cornelius, NC (US) 28031; Robert Beazley, 196 Sink Farm Rd., Davidson, NC (US) 28115

( * ) Notice: Subject to any disclaimer, the term of this patent is extended or adjusted under 35 U.S.C. 154(b) by 287 days.

(21) Appl. No.: 09/792,572

(22) Filed: Feb. 23, 2001

(65) Prior Publication Data

US 2001/0024906 A1 Sep. 27, 2001

Related U.S. Application Data

(60) Provisional application No. 60/184,675, filed on Feb. 24, 2000.

(51) Int. Cl.[7] .............................................. H04M 11/00
(52) U.S. Cl. ................................ 379/90.01; 379/167.01
(58) Field of Search ................ 379/90.01, 93.05–93.08, 379/93.37, 167.01, 167.11, 167.13, 177, 156, 158, 159, 93.14

(56) References Cited

U.S. PATENT DOCUMENTS

| 5,883,944 A | * | 3/1999 | Burke et al. ................. 379/159 |
| 6,263,063 B1 | * | 7/2001 | Bansal et al. ................ 379/177 |
| 6,400,815 B1 | * | 6/2002 | Gilboy et al. ............ 379/167.01 |

* cited by examiner

Primary Examiner—Wing Chan
(74) Attorney, Agent, or Firm—Kajane McManus

(57) ABSTRACT

The apparatus of the present invention comprises an electronic patch panel controller apparatus for use in environments where multiple internal handset lines share connectivity to a lesser number of external telephone lines, the control apparatus patching excess internal handset lines to available web based external lines accessible at a website accessed via a browser in process memory, the website providing commands for latching and unlatching engagement between pairs of cooperating active and passive ports to multiple external telephone lines accessible at and via the website, by a remote processor, the controller being manually or automatically operable.

2 Claims, 8 Drawing Sheets

| PIN | SIGNAL | PIN | SIGNAL |
|---|---|---|---|
| 1 | AT0 | 2 | AR0 |
| 3 | AT1 | 4 | AR1 |
| 5 | AT2 | 6 | AR2 |
| 7 | AT3 | 8 | AR3 |
| 9 | AT4 | 10 | AR4 |
| 11 | AT5 | 12 | AR5 |
| 13 | AT6 | 14 | AR6 |
| 15 | AT7 | 16 | AR7 |
| 17 | N/C | 18 | N/C |
| 19 | PT0 | 20 | PR0 |
| 21 | PT1 | 22 | PR1 |
| 23 | PT2 | 24 | PR2 |
| 25 | PT3 | 26 | PR3 |
| 27 | PT4 | 28 | PR4 |
| 29 | PT5 | 30 | PR5 |
| 31 | PT6 | 32 | PR6 |
| 33 | PT7 | 34 | PR7 |
| 35 | PT8 | 36 | PR8 |
| 37 | PT9 | 38 | PR9 |
| 39 | PT10 | 40 | PR10 |
| 41 | PT11 | 42 | PR11 |
| 43 | PT12 | 44 | PR12 |
| 45 | PT13 | 46 | PR13 |
| 47 | PT14 | 48 | PR14 |
| 49 | PT15 | 50 | PR15 |

NOTES: AT(0-7) AND AR(0-7) DEFINE "ACTIVE INPUTS" PT(0-15) AND PR(0-15) DEFINE "PASSIVE OUTPUTS" AT = ACTIVE TIP, AR = ACTIVE RING, PT = PASSIVE TIP, PR = PASSIVE RING

EPP SOFTWARE FLOW CHART  FIG. 9

1. START-UP

 INITIALIZE ACTIVE AND PASSIVE ARRAYS.
RETRIEVE SET UP INFORMATION FROM REGISTRY.
ACTIVATE ABILITY TO BE MONITORED.

2. SET HARDWARE

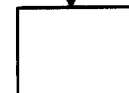 READ HARDWARE CONFIGURATION AND ACTIVATE SOFTWARE ARRAYS FOR ACTIVE AND PASSIVE PORTS

3. SET HARDWARE SWITCHES

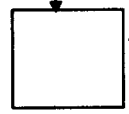 READ DATABASE FROM LAST GOOD SETTINGS AND CONFIGURE SWITCH TO MATCH. GO INTO A WAIT STATE UNTIL AN EXTERNAL INTERRUPT CHANGES THE CONFIGURATION.

SERVICE REMOTE CONTROL ("RC") MONITOR INTERRUPT

4. SERVICE RC

 SAVE CONNECTION INFORMATION FROM EXTERNAL INTERRUPT.

5. USER INPUT

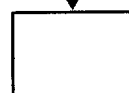 READ THE USER INPUT AND MODIFY THE REQUESTS FOR ACTIVE AND PASSIVE PORT MODIFICATIONS

6. EXTERNAL INTERRUPT HOUSEKEEPING

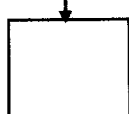 LOG ALL CHANGES TO THE DATABASE IN CASE OF A FAILURE

CLEAR CONNECTION SETTINGS

7. CLEAR CONNECTIONS ROBOT

 CLEAR ACTIVE AND PASSIVE CONNECTIONS BASED ON USER OPTIONS IN REGISTRY

ELECTRONIC PATCH PANEL APPARATUS AND METHOD OF USE

CROSS REFERENCE TO RELATED APPLICATIONS

This application is a continuation-in-part of U.S. Provisional Patent Application Ser. No. 60/184,675, filed on Feb. 24, 2000, titled Electronic Patch Panel.

BACKGROUND OF THE INVENTION

1. Field of the Invention

The present invention relates to a programmable apparatus which acts to increase phone line connection capacity. More particularly, the programmable apparatus is integrated into a phone system, such as that of a hotel, for example, which has a finite number of active outgoing telephone lines which is less than the number of internal telephone handsets, for increasing the number of active ports above the finite number by linking to a website through use of a browser of a web linked computer, the website providing a substantially unlimited number of external telephone access lines which can be used by all internal telephone handset lines of the hotel, simultaneously, as necessary, to accommodate telephone line accessibility by all internal handset lines, either manually or automatically.

2. Prior Art

Heretofore, capacity of simultaneously available telephone lines within an establishment, such as a hotel, for example, is always less than the number of internal telephone handset lines due to prohibitive costs of accommodation of all handsets since, typically, all internal handsets are never in use simultaneously. However, there are occasions, when demand is greater than such lesser number of available external telephone lines, causing users to have to wait for line availability, which may cause patrons to turn away from use of the establishment in the future.

To date, there has been no way around the supply/demand dilemma except to provide a number of external lines equal to the number of handsets therefor, at impractical cost, and thus it is never done.

SUMMARY OF THE INVENTION

According to the invention there is provided a programmable electronic patch panel controller apparatus for use in connecting a multiplicity of internal telephone handset lines to internet accessible external telephone lines which are accessed via a browser of a processor which is directed to a particular website affording access to external web based telephone lines, the apparatus comprising a controller incorporating at least:

a motherboard;

connections for functionally engaging a plurality of telephone handset lines to the apparatus;

a keyboard connection for connecting a keyboard to the motherboard for manual keyed input thereto;

a monitor connection for the motherboard for visibility of parameters and information provided via a monitor engaged to the connection;

an ethernet port for creating a connection between the motherboard and the particular website via the processor incorporating the browser;

active and passive port boards functionally engaged to the motherboard;

a programmable hard drive processor functionally engaged to the motherboard;

a memory module functionally engaged to the hard drive;

a power supply;

and programming within the processor of the apparatus to produce latching and unlatching between active and passive port pairs of the active and passive port boards as necessary through commands received via the web browser from a server computer to assure connection of the plurality of handset telephone lines to the web based external telephone lines.

Still further according to the invention there is provided a method for using the electronic patch panel controller apparatus for accomplishing the specific goal thereof.

BRIEF DESCRIPTION OF THE DRAWINGS

FIG. 9 is a simplified logic flow chart of steps taken by the preprogrammed software of the apparatus in accomplishing the goal thereof.

DESCRIPTION OF THE PREFERRED EMBODIMENT

Figure 1A:
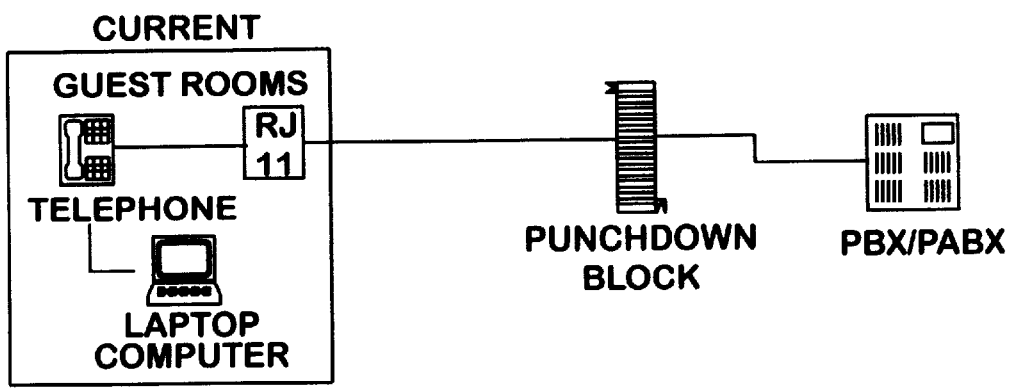
FIG. 1A is a simple perspective view of an existing telephone system of an establishment.
Figure 1B:
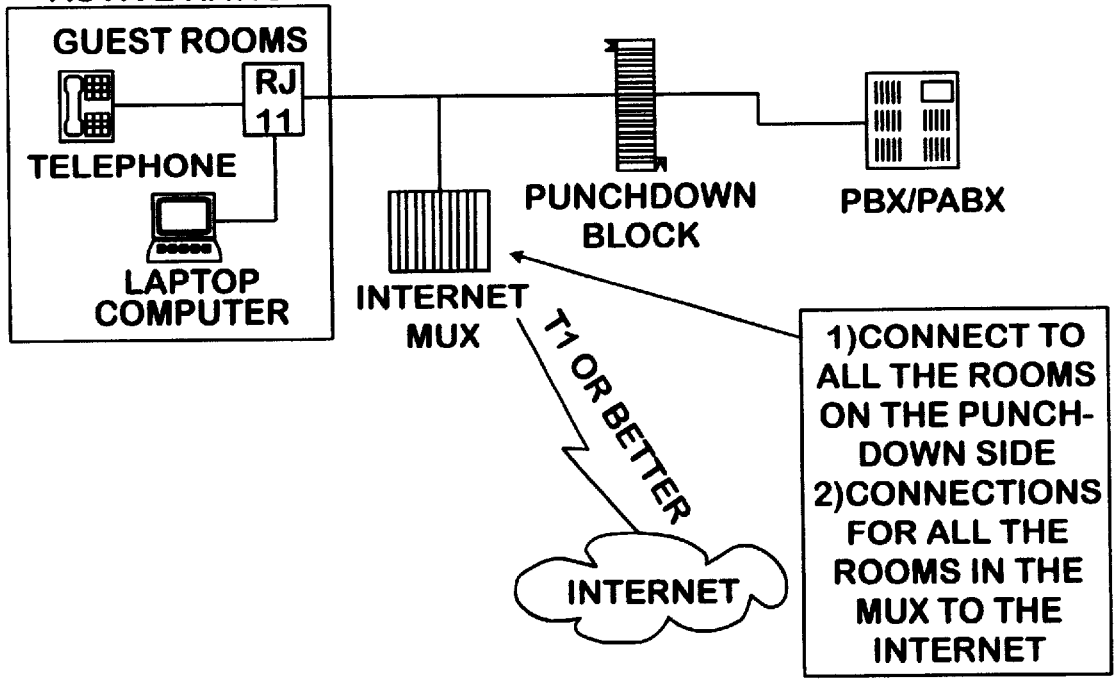
FIG. 1B is a simple perspective view of an existing telephone system of an establishment incorporating an internet MUX having a one to one connecting ratio.

Referring now to the drawings in greater detail, there is illustrated therein the programmable apparatus of the present invention generally identified by the reference numeral 10 and referred to herein as a controller apparatus 10.

Figure 2:
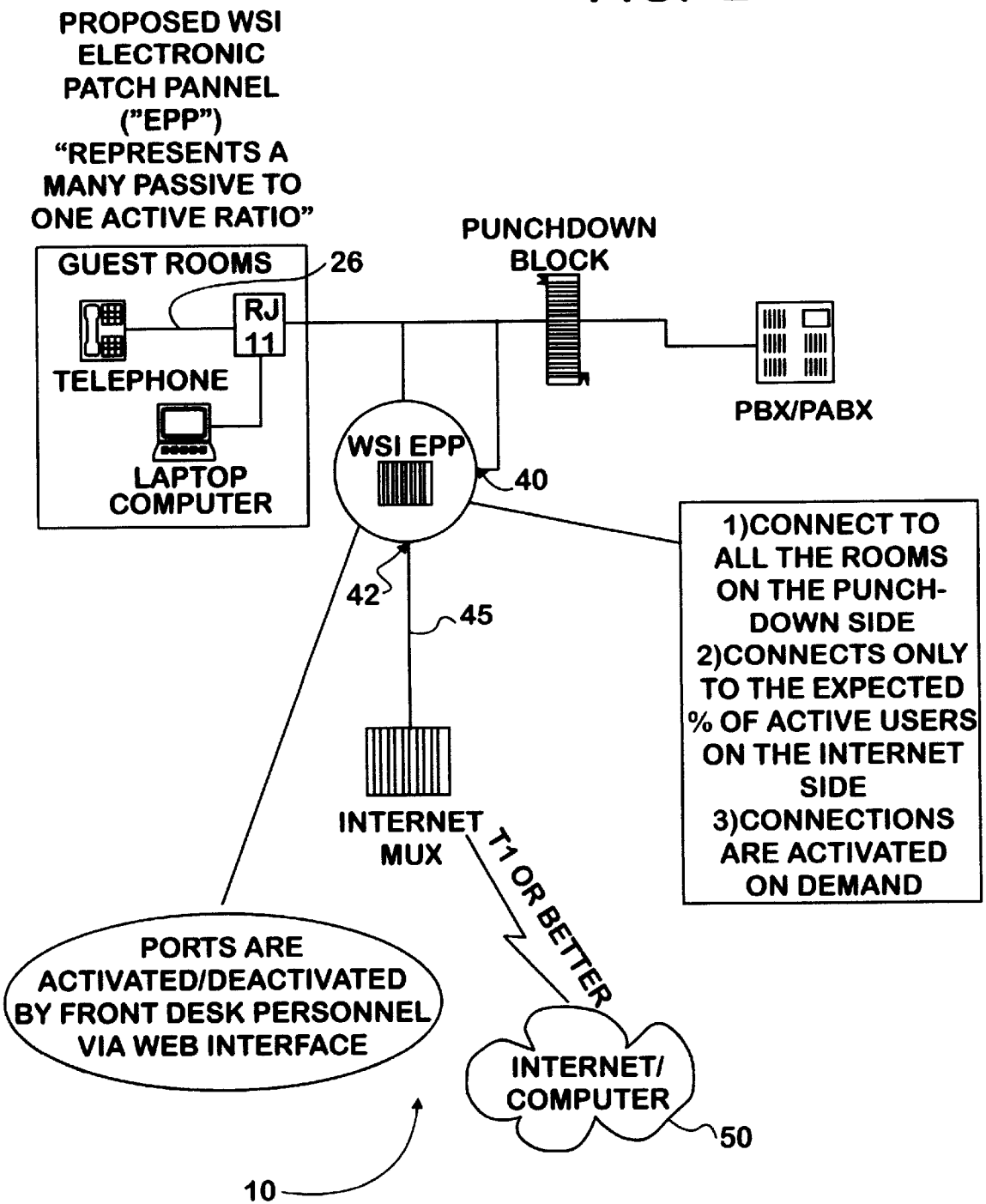
FIG. 2 is a simple perspective view of the system of FIG. 2 showing the electronic patch panel apparatus of the present invention incorporated therein.

FIG. 2 shows the controller apparatus 10 connected to all handset lines of an establishment at a position upstream of a punchdown block of a telephone system.

In perusing the further, more detailed Figures showing the presently preferred embodiment of the controller apparatus 10, it will be seen to include a motherboard 12 engaged to a power supply 14, and having an onboard programmable hard drive or processor 16 including a memory 17, with a first port 18 provided for engagement of a monitor 19, a second port 20 for engagement of a keyboard 21, a third serial port 22 for engagement of a serial device such as a mouse (not shown) and a fourth ethernet port 24. A fifth port 25 is also provided by means of which a telephone handset line 26 is connectable to the apparatus 10 as well.

Figure 5:
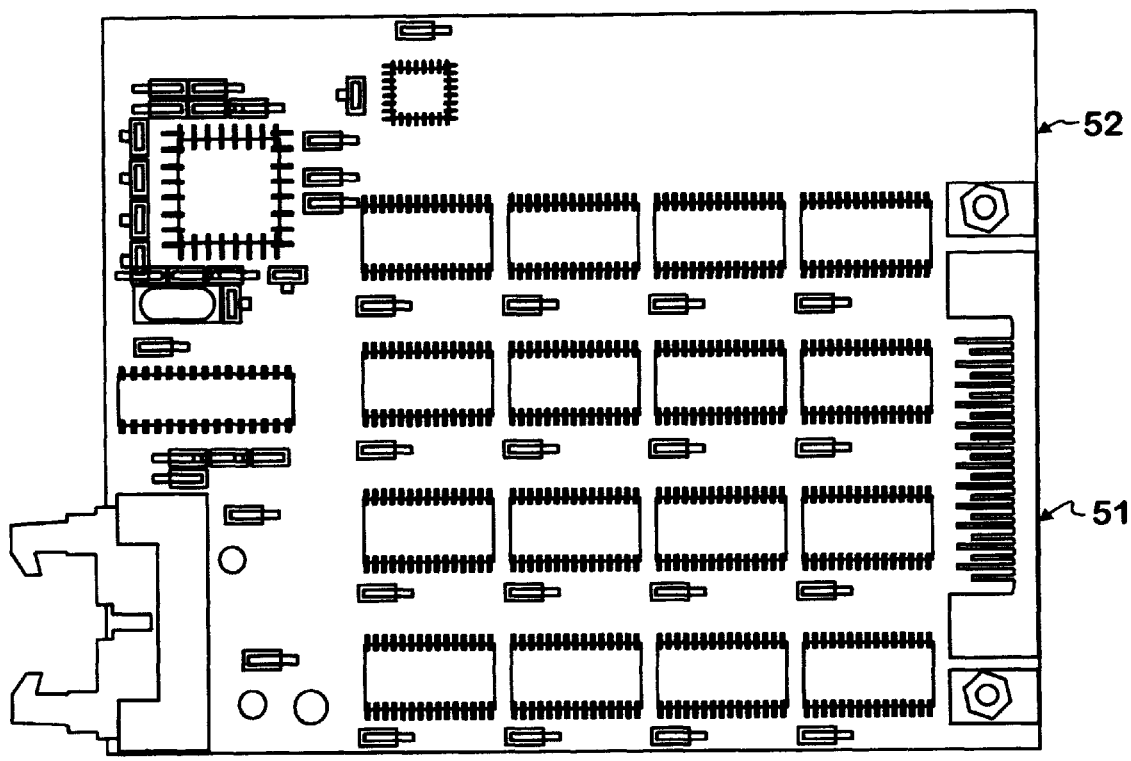
FIG. 5 is a top plan view of one of the active and passive port boards of FIG. 4.

Also provided on the motherboard 12 are a plurality of card engaging slots 28. To each of these slots 28 is attached a circuit board 30 defined as a passive and active port board 30, as illustrated in FIG. 5 which incorporates electronic latchable input/output ports thereon which are program actuated, as will be defined hereinbelow.

It will be understood that any desired plurality of card slots 28 may be accommodated the apparatus 10 as necessary to accommodate the total number of telephone handset lines 26 within a particular establishment, such as a hotel, for instance. It will also be understood that the handset lines 26 are functionally connected to passive ports 40 of the boards 30 while the external telephone lines 45 of the establishment, typically far fewer than the number of handset lines 26, are connected to the active ports 42 of the boards 30.

Inasmuch as it is understood that cooperating active and passive port 40, 42 pairs must be cooperably latchable to engage a particular handset line 26 to an external telephone line 45 on demand and to be unlatchable when connection is terminated by a user, to allow latchability of another handset line 26, it will be understood that programming is required within the processor 16 to accomplish the latching and unlatching.

Further, it will be understood that provision of external telephone line connections (not shown) to which handset lines 26 are capable of gaining access is provided through use of an ethernet connection via the ethernet port 24 to a particular website on the internet, via a browser of an internet capable computer 50.

Accordingly, programming for gaining access to the website via a web browser must be provided and loaded into the memory 17 of the hard drive processor 16.

Further, programming for latching and unlatching of cooperating port pairs as defined above must be provided.

Thirdly, programming must be provided for activation of the apparatus 10 on demand, whether through manual commands issued via the keyboard 21, or whether the apparatus 10 is of the self actualizing type.

Turning for a moment to the required programming, and viewing FIG. 9, there is found illustrated therein a simplified generic flow chart of the logic used by the apparatus 10, in its most simplistic form for operability, which should not be constructed as limiting inasmuch as it will be appreciated by those skilled in the art that ancillary steps can be added as desired, within the obvious structural limitations of the apparatus 10 to make same more "feature oriented" and can also have incorporated various "bells and whistles" which may be desired by a particular establishment using the apparatus 10.

At step 1 of the Software Flow Chart, the ports 40, 42 on the active and passive port boards 30 are initialized, set up information stored in the registry in processor memory 17 is retrieved, and monitoring of the apparatus 10 is activated.

At step 2 labelled Set Hardware, the hardware configuration of the apparatus 10 is read into memory 17 and, based on the determined hardware configuration, software arrays for the ports 40, 42 on the active and passive port boards 30 are activated, to allow for desired latching and unlatching between corresponding active/passive port pairs 40, 42.

At step 4 of a Service Remote Control "RC" Monitor Interrupt Software Flow Chart, labelled Service RC, connection information culled from an external interrupt, is saved to memory 17.

At step 5, labelled User Input, in an apparatus 10 which is manually controlled by input from the keyboard 21, the input is read and, based on the input, the ports of the active and passive port boards 30 are modified, or latched, the input being read in the form of a request for such latching.

At step 6, labelled External Interrupt Housekeeping, the modifications made at step 5 are entered into a database log in memory 17 for possible retrieval therefrom should the need arise, such as in the case of apparatus 10 failure, such as during a power outage, for example.

Finally, under Clear Connection Settings, at Step 7, labelled Clear Connections Robot, user options located in the registry portion of processor memory 17 are read and the latched cooperating ports on the active and passive port boards 30 are unlatched when external telephone line connection via the website access is no longer required, when a handset 46 is replaced onto its cradle 48.

It will also be understood that the apparatus 10 can be automated through use of cycling logic to check for handset 46 disengagement and engagement from the cradle 48 to produce the desired latching and unlatching, respectively so the above manually activated logic should not be construed as limiting, but rather as exemplary.

The apparatus 10 will be understood to be compatible with voice signals (POTS) which may be of the analog or PBX type as well as with data signals which may be any single one or combination of DSL, HPNA (home Network), and Ethernet type.

Figure 8:
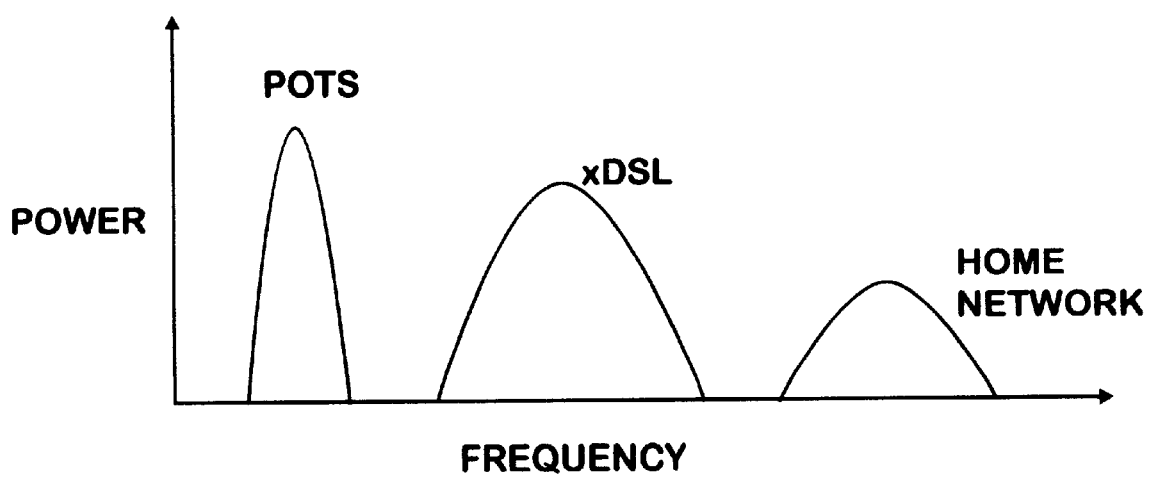
FIG. 8 is a graphic representation of simultaneous signal accommodation over one telephone line.

As crudely illustrated in FIG. 8, it will be understood by those skilled in that art that one pair of telephone wires (not shown) is capable of providing three separate channels for simultaneous voice signal transmission, internet access signal transmission, and home network signal transmission, inasmuch as each type of signal is mutually exclusive of the others in both power and frequency parameters.

Figure 3:
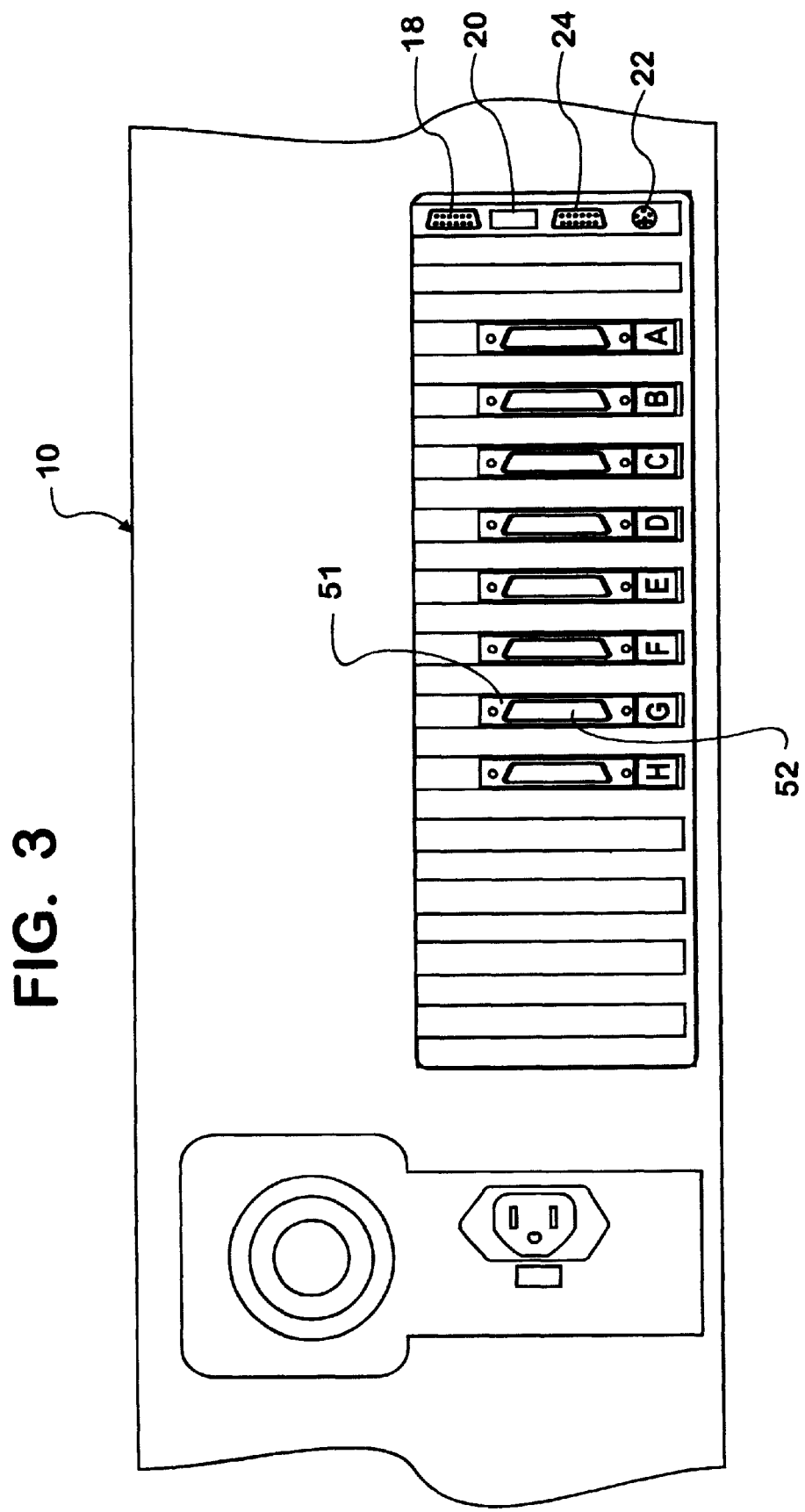
FIG. 3 is rear view of the apparatus showing connectivity structures thereof.
Figure 4:
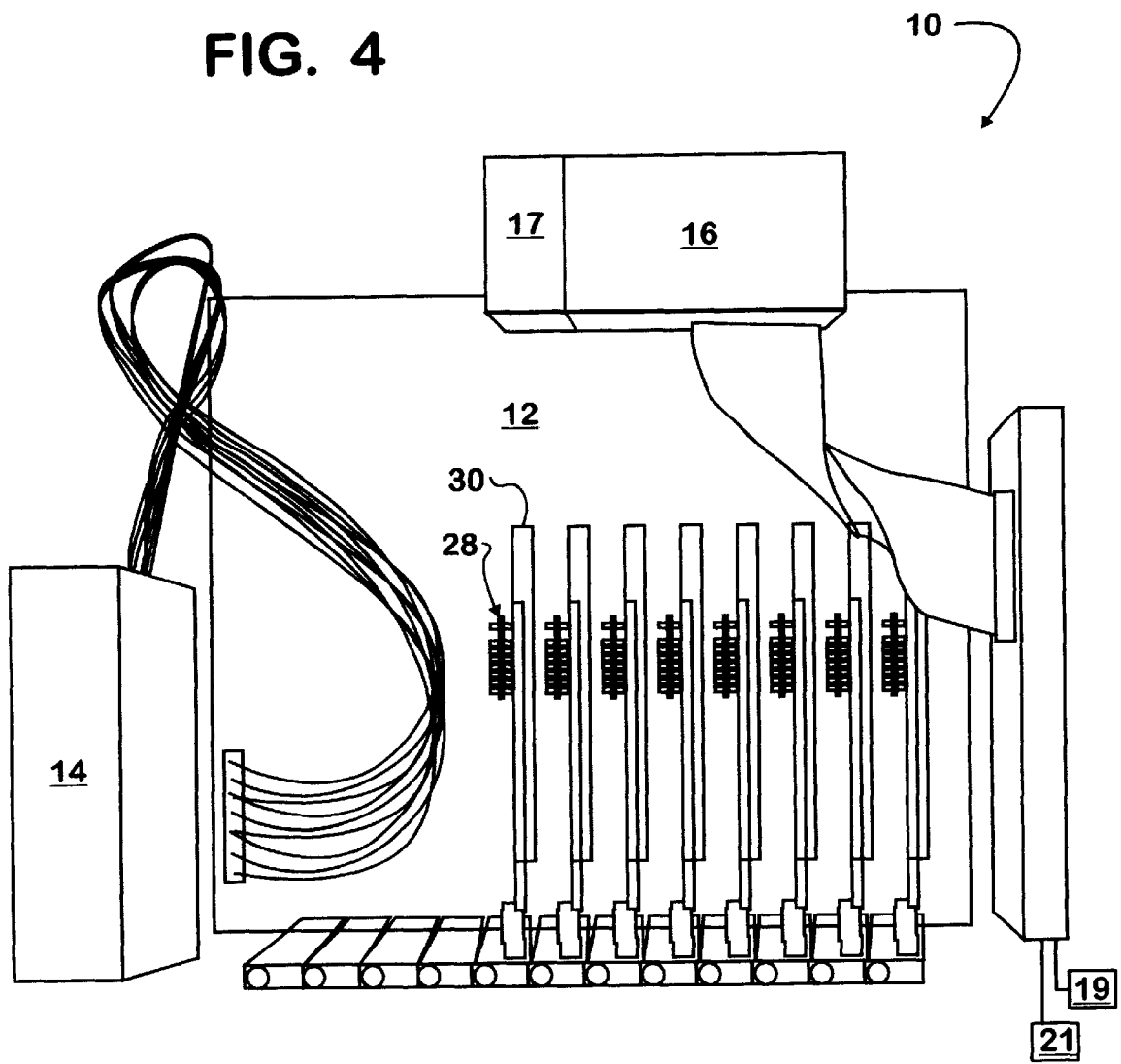
FIG. 4 is a simplified top plan view of the motherboard and associated structures of the apparatus.

From the rear view of the apparatus 10 in FIG. 3, it will be seen that each active and passive board 30 is mounted to a rear bracket 51 incorporating a standard SCSI-II high density 50 pin connector 52 which is available from various sources. As an example, Adams Tech Part No. S2ASR50BL2 and mating Part No. S2APW50 & S2A-HD-PWA-50 Metal Hood, can be used in the apparatus 10.

Figures 6, 7:
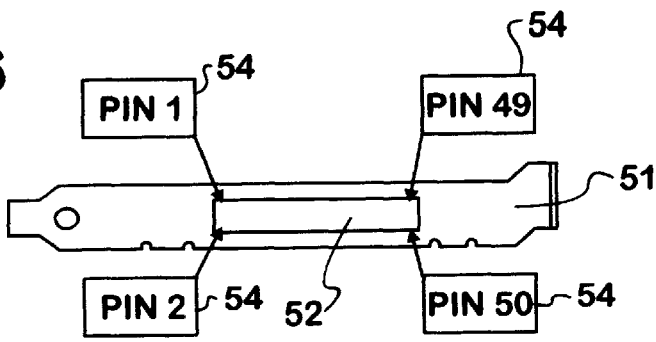
FIG. 6 is an enlarged simplified view of one rear connector of one board of FIG. 5.
FIG. 7 is a graph showing characteristics of exemplary pins of the connector of FIG. 6.

A simplified view showing four pins 54 of the connector 52 is illustrated in FIG. 6, with a Table defining signal connections for pins 54 of the connector 52, including explanatory legends, being provided in FIG. 7.

As detailed above, the apparatus 10 and method of its use provide a number of advantages, some of which are inherent in the invention. Also, modifications can be proposed to the teachings herein without departing therefrom. Accordingly, the scope of the invention is only to be limited as necessitated by the accompanying claims.

We claim:

1. A programmable apparatus for use in connecting a multiplicity of internal telephone handset lines to internet accessible external telephone lines which are accessed via a browser of a processor which is directed to a particular website affording access to external web based telephone lines, the apparatus comprising a controller incorporating at least:

a motherboard;

connections for functionally engaging a plurality of telephone handset lines to the apparatus;

a keyboard connection for connecting a keyboard to the motherboard for manual keyed input thereto;

a monitor connection for the motherboard for visibility of parameters and information provided via a monitor engaged to the connection;

an ethernet port for creating a connection between the motherboard and the particular website via the processor incorporating the browser;

active and passive port boards functionally engaged to the motherboard;

a programmable hard drive processor functionally engaged to the motherboard;

a memory module functionally engaged to the hard drive;

a power supply;

and programming within the processor of the apparatus to produce latching and unlatching between active and passive port pairs of the active and passive port boards as necessary through commands received via the web browser from a server computer to assure connection of the plurality of handset telephone lines to the web based external telephone lines.

2. A method for using a programmable apparatus for use in connecting a multiplicity of internal telephone handset lines to internet accessible external telephone lines which are accessed via a browser of a processor which is directed to a particular website affording access to external web based telephone lines, the apparatus comprising a controller incorporating at least:

a motherboard;

connections for functionally engaging a plurality of telephone handset lines to the apparatus;

a keyboard connection for connecting a keyboard to the motherboard for manual keyed input thereto;

a monitor connection for the motherboard for visibility of parameters and information provided via a monitor engaged to the connection;

an ethernet port for creating a connection between the motherboard and the particular website via the processor incorporating the browser;

active and passive port boards functionally engaged to the motherboard;

a programmable hard drive processor functionally engaged to the motherboard;

a memory module functionally engaged to the hard drive;

a power supply;

and programming within the processor of the apparatus to produce latching and unlatching between active and passive port pairs of the active and passive port boards as necessary through commands received via the web browser from a server computer to assure connection of the plurality of handset telephone lines to the web based external telephone lines;

the method comprising the steps of:

initializing the port boards;

retrieving set up information from processor memory;

activating internal monitoring of the apparatus;

reading apparatus hardware configuration into processor memory;

activating software arrays in processor memory for ports of the port board to allow for latching between pairs of ports, one of which is active and another of which is passive;

culling connection information provided via an external interrupt received over the ethernet connection;

saving the connection information to processor memory;

receiving user input instructions via the keyboard;

reading the user input instructions;

causing latching of cooperating pairs of active and passive ports based on the user input instructions read;

entering latching information into a log in memory in retrievable form;

reading user options stored in processor memory; and in connection between the active and passive prot pairs is no longer required; causing unlatching therebetween.

* * * * *